United States Patent [19]
Archibald

[11] Patent Number: 5,651,226
[45] Date of Patent: Jul. 29, 1997

[54] TILE WITH SOLAR ENERGY COLLECTION CAPABILITY

[76] Inventor: John P. Archibald, 8703 Chippendale Ct., Annandale, Va. 22003

[21] Appl. No.: 386,723

[22] Filed: Feb. 10, 1995

[51] Int. Cl.$^6$ ................................................. E04D 13/18
[52] U.S. Cl. ........................... 52/518; 52/520; 52/530; 126/622
[58] Field of Search ........................ 126/622; 52/530, 52/518, 520, DIG. 17

[56] References Cited

U.S. PATENT DOCUMENTS

| | | |
|---|---|---|
| 633,019 | 9/1899 | Ludeling . |
| 650,939 | 6/1900 | Kasch . |
| 777,058 | 12/1904 | Mitchell . |
| 880,012 | 2/1908 | Christensen . |
| 964,059 | 7/1910 | Sawyer . |
| 1,714,800 | 5/1929 | Minnec . |
| 1,752,593 | 4/1930 | Giordano . |
| 2,377,398 | 6/1945 | Brostrom . |
| 2,469,496 | 5/1949 | Christenson . |
| 2,624,298 | 1/1953 | Mayo . |
| 2,625,930 | 1/1953 | Harris . |
| 2,644,410 | 7/1953 | Weber . |
| 2,984,945 | 4/1961 | Campbell . |
| 3,349,534 | 10/1967 | Wotherspoon . |
| 3,667,184 | 6/1972 | Merrill . |
| 3,855,753 | 12/1974 | Terry . |
| 3,897,667 | 8/1975 | Turek . |
| 3,919,998 | 11/1975 | Parker . |
| 3,996,918 | 12/1976 | Quick . |
| 4,022,186 | 5/1977 | Northrup, Jr. . |
| 4,040,211 | 8/1977 | Wotherspoon . |
| 4,058,109 | 11/1977 | Gramm . |
| 4,083,360 | 4/1978 | Courvoisier . |
| 4,111,188 | 9/1978 | Murphy, Jr. . |
| 4,123,003 | 10/1978 | Winston . |
| 4,145,860 | 3/1979 | Wotherspoon . |
| 4,202,319 | 5/1980 | Vinz . |
| 4,204,520 | 5/1980 | Rosenberg . |
| 4,221,208 | 9/1980 | Murphy, Jr. . |
| 4,226,070 | 10/1980 | Aragon . |
| 4,244,353 | 1/1981 | Straza . |
| 4,273,106 | 6/1981 | Gould . |
| 4,278,071 | 7/1981 | Brill-Edwards . |
| 4,284,065 | 8/1981 | Brill-Edwards . |
| 4,299,201 | 11/1981 | Tsubota . |
| 4,319,437 | 3/1982 | Murphy . |
| 4,359,043 | 11/1982 | Dominique . |

(List continued on next page.)

FOREIGN PATENT DOCUMENTS

| | | |
|---|---|---|
| 762759 | 4/1934 | France . |
| 2330974 | 3/1977 | France . |
| 1900069 | 9/1970 | Germany . |
| 2309307 | 8/1974 | Germany . |
| 2529095 | 1/1977 | Germany . |
| 2650208 | 3/1978 | Germany . |
| 282024 | 4/1952 | Switzerland . |

Primary Examiner—Christopher T. Kent
Attorney, Agent, or Firm—Cushman Darby & Cushman, IP Group of Pillsbury Madison & Sutro

[57] ABSTRACT

A surfacing tile, having a convex and concave surface and two spaced apart sides, is made of a material that allows at least a portion of the solar energy impinging upon the tile to be transmitted through the tile and be absorbed by a supporting surface thereunder. Once absorbed by the surface, most of the energy is prevented from escaping by the glazing effect of the tile. The tile, together with the underlying surface, forms an airspace therebetween such that a plurality of interfitting tiles installed upon the surface will form ducts that can conduct a fluid, such as air, heated by the absorbed solar energy to a location at which it can be used or dissipated. Tiles installed in such a fashion thus form a solar energy collection system directly with the surface upon which they are installed. One contemplated variation in the design of the tile is to provide interlocking features to allow installed tiles to interlock with adjacent installed tiles, thus effecting a stronger, more air and water tight surface covering. Other contemplated variations in tile design include different shapes or repeating shapes, different colors to vary the aesthetics of the surface, and providing integral insulating features within the body of the tile.

38 Claims, 7 Drawing Sheets

U.S. PATENT DOCUMENTS

| | | |
|---|---|---|
| 4,382,435 | 5/1983 | Brill-Edwards . |
| 4,405,396 | 9/1983 | Brill-Edwards . |
| 4,428,360 | 1/1984 | Cohen . |
| 4,428,361 | 1/1984 | Straza . |
| 4,454,863 | 6/1984 | Brown . |
| 4,691,492 | 9/1987 | Kane . |
| 4,716,701 | 1/1988 | Talbot . |
| 4,787,190 | 11/1988 | Papsdorf . |
| 4,946,512 | 8/1990 | Fukuroi . |
| 4,953,537 | 9/1990 | Allegro . |
| 4,967,729 | 11/1990 | Okumura . |
| 5,014,770 | 5/1991 | Palmer . |
| 5,022,381 | 6/1991 | Allegro . |
| 5,074,093 | 12/1991 | Meadows . |
| 5,112,408 | 5/1992 | Melchior . |
| 5,217,000 | 6/1993 | Pierce-Bjorklund . |

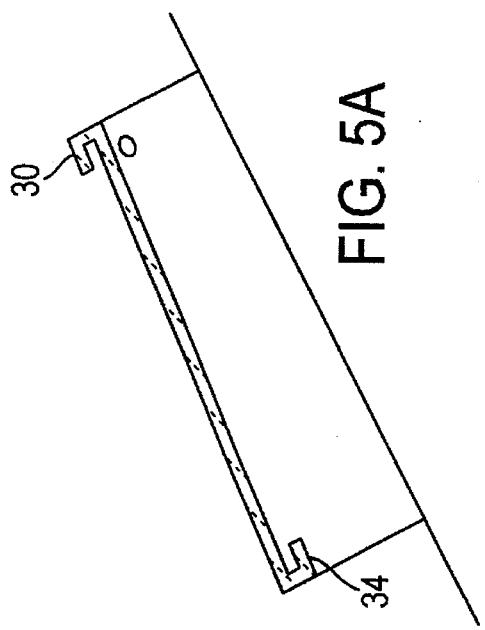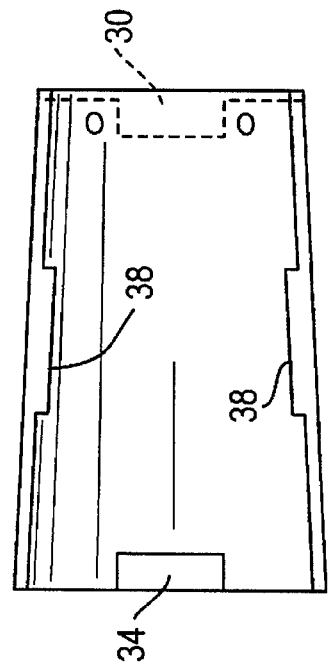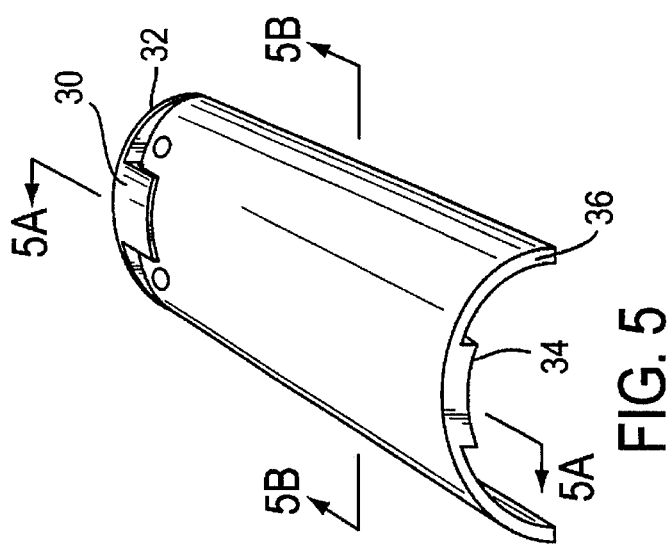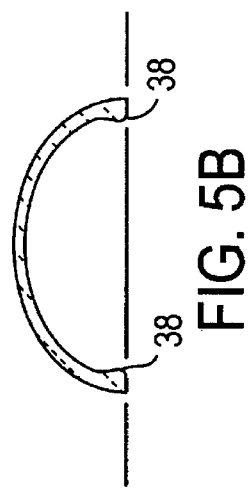

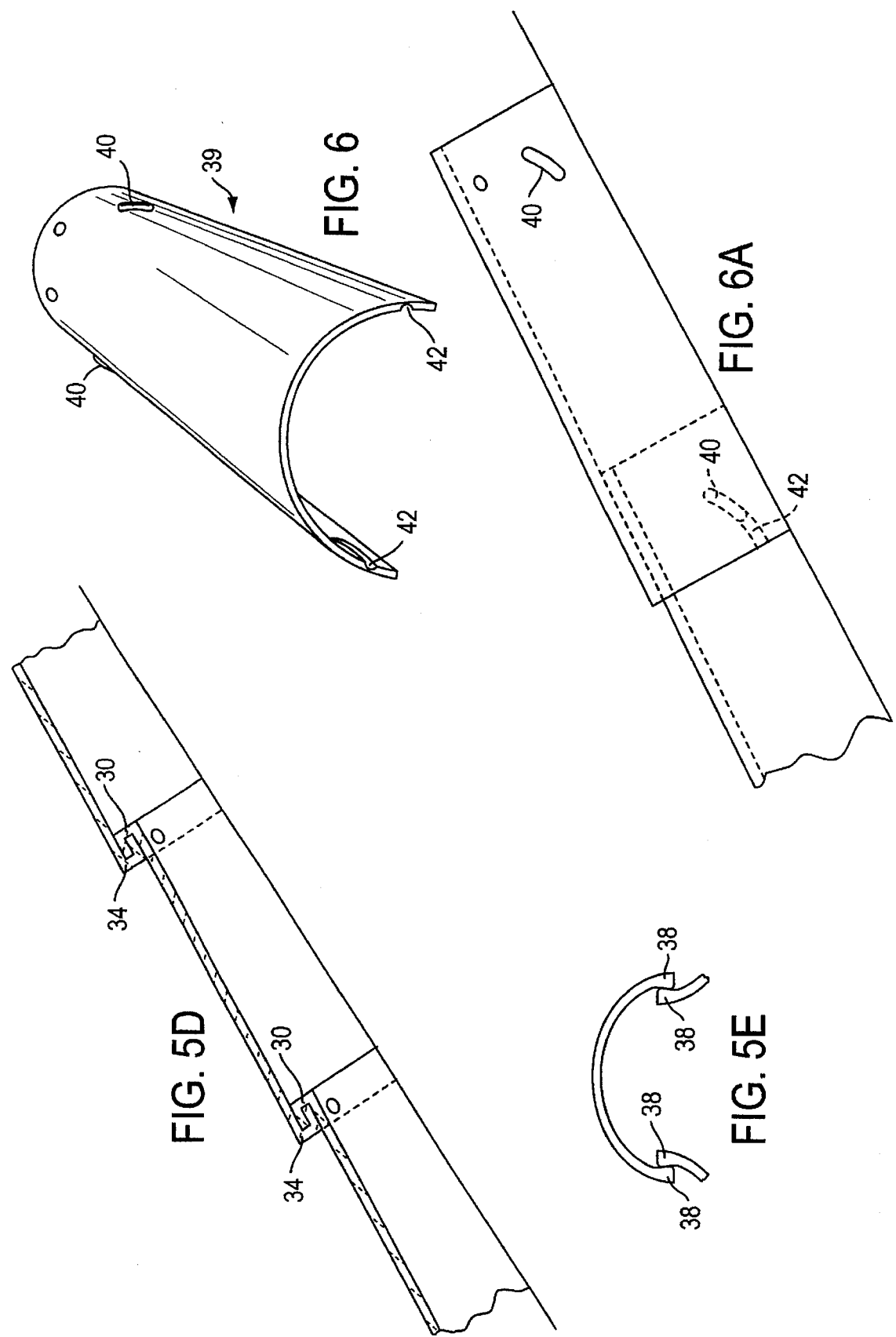

TILE WITH SOLAR ENERGY COLLECTION CAPABILITY

BACKGROUND OF THE INVENTION

1. Field of the Invention

The present invention relates to a tile suitable for use on a variety of surfaces including walls, roofs or other defined areas. The tile is translucent or transparent to solar energy and, in direct conjunction with the underlying surface, provides a conduction path for an energy transfer fluid heated by solar energy effects on the underlying surface.

2. Description of the Related Art

Various elements for incorporation with solar energy collection systems have been developed in an effort to provide a solar energy collection system that can be placed on and, to some extent, blend in with a surrounding surface structure. Each of the designs have a number of disadvantages.

For example, U.S. Pat. No. 4,083,360 to Courvoisier et al. describes the use of transparent tiles to allow solar energy to pass through to an underlying solar energy absorbing plate. The tile is designed to resist precipitation and provide additional insulation above the absorbing plate. The tiles, however, do not themselves form a mechanism for collecting the heat from the absorbing plate and conducting it away for use. In fact, the tiles are specifically designed to prevent the motion of a solar energy transfer fluid, such as air, along their length. They also do not form an entire roof structure but rather only provide covering for the area of the discrete solar energy absorbing plates.

U.S. Pat. Nos. 4,953,537 and 5,022,381 to Allegro describe a roofing element with a transparent top surface and a closed conduit segment, internal to the tile, for carrying a heat absorbing fluid and for connecting to other like closed conduit segments in adjacent tiles. Such roofing elements require substantial amounts of material and relatively complicated fabrication techniques. Further, when properly interconnected the roofing elements collectively provide a closed internal conduit for the heat exchange fluid. Additionally, they do not use all of the solar energy falling on the roof due to the reduced areas available for transmission and absorption of solar energy in order to provide areas for fastening the elements to the roof and for overlapping mating edges. If used as the primary shingling of the roof, the elements require glue or tar as a sealant.

A number of patents disclose hollow, box-like elements having couplings for connecting each element to adjacent elements to provide a continuous fluid flow path between the elements. For example, U.S. Pat. No. 4,428,360 to Cohen describes a shingle system in which individual shingles have top and bottom plates which are seamed to form a closed cavity therebetween for containing a fluid that is heated by solar energy. Individual shingles also have fluid inlet and outlet couplings for connecting each shingle in open flow communication with surrounding shingles. U.S. Pat. No. 4,359,043 to Dominique et al. describes a roofing member with top and bottom plates forming a closed cavity therebetween for containing a heat absorbing fluid. Tubular conduit segments project from the top plate and extend into a cavity in the bottom plate of an adjacent, overlapping roofing member to form a passageway to allow the heat absorbing fluid to flow from one member to an adjacent member. U.S. Pat. Nos. 4,428,361 and 4,244,353 to Straza describe a solar heating shingle comprising a flat hollow body of the same general size and configuration as a conventional shingle with fluid inlets and outlets. The inlets and outlets of longitudinally overlapping shingles are connected to effectively create a closed path for the flow of a heat exchanging fluid. All these shingles or roofing elements are complex to fabricate and install due to the double walled construction and the need to properly interconnect adjacent members to form the closed fluid path. The elements also require additional material and components to provide the bottom plate and fluid couplings, restrict fluid flow through the interconnecting fittings, and suffer stresses from repeated cycles of thermal expansion and contraction at the fittings which tend to separate or wear out the connections for the flow of heat transfer fluid.

U.S. Pat. Nos. 4,284,065 and 4,405,396 to Brill-Edwards describe roofing panels with rows of longitudinal corrugations that simulate rows of conventional roofing tiles. The panels are fabricated with a matrix of closed channels therein for transmitting a heat exchange fluid. U.S. Pat. Nos. 4,278,071 and 4,382,435, also to Brill-Edwards, describe roofing panels with an outer skin and an inner liner spaced from the outer skin by longitudinal beams so as to form tunnels between the outer skin and the inner liner from the eaves of the roof to the crest. In both types of panels, the top surface of the panel is heated by solar energy and the heat exchange fluid is conducted up through the panel from the bottom to the top of the roof. The panels rely on the outer surface to absorb solar energy which can easily loose heat to the atmosphere above the panel. Furthermore, the panels require additional material because of the presence of the bottom surface and other structures and require complex fabrication and installation processes. Also, because the panels extend from the top to the bottom of the roof, they are not easily installed around or adapted to any protrusion through the roof such as chimneys, vent pipes, dormers, and other similar roofing obstacles.

U.S. Pat. No. 2,624,298 to Farren describes a solid, totally opaque roof tile with a lower end that is closed and longitudinal and lateral air passages integral to the bottom of the tile for promoting air circulation within the body of the roof. The design, however, incorporates several grooves and ribs in the bottom surface of the tile which restrict the flow of air compared to one large opening. No mention is made of an air passage for the purpose of ducting heat generated by solar energy, nor of constructing a tile that allows solar energy to pass through the tile to be absorbed by the surface material below the tile.

U.S. Pat. No. 4,967,729 to Okumura discloses a solar energy collector that comprises multi-layer panels including a metal top plate and a bottom plate constructed with a heat insulation layer and an airflow path defined therebetween. The upper plate is heated by solar energy and heat is conducted away by air in the airflow path that lies adjacent the top metal surface. Layers of glass placed over the metal plate toward the top of the roof act as a glazing that allow the metal plate thereunder to reach higher than ambient temperatures due to absorbed solar radiation because the glazing acts to prevent the loss of absorbed solar energy. The panels require additional material and more complex fabrication due to the use of top and bottom plates in the construction of the airflow path. Furthermore, because the panels extend from the top to the bottom of the roof, they are not easily installed around or adapted to any protrusion through the roof such as chimneys, vent pipes, or dormers. In addition, the heated air between the glass plates and the metal top plate is not collected for use. Finally, the unglazed portion of the metal top plate at the lower portion of the roof can loose substantial energy to the atmosphere.

Finally, U.S. Pat. No. 4,299,201 to Tsubota discloses a Spanish-style tile having multiple fine menisci on its inner surface to focus incident sunlight onto a solar energy conversion device, such as a pipe with a heat transfer fluid flowing therethrough, disposed within the open area beneath the tile. The energy conversion device disclosed is a closed system for conducting a solar energy collecting fluid. The fabrication of this device would be complex and would require additional components to provide for the solar energy conversion device. Furthermore, solar energy passing through the tile surface from many angles will not be focused on the solar energy conversion device but will strike the surrounding roof surface and be wasted because the heated air beneath the tile is not collected for use. The resulting buildup of heat beneath the tile will also result in larger energy losses to the surroundings.

As can be seen, there remains a need for surface covering tiles that can transmit, by radiation, all solar energy impinging upon the surface area covered by the tiles to an underlying surface to be absorbed thereby so that an energy transfer fluid moving directly between the interior of the tile and the underlying surface will be heated and conducted within an open fluid flow path between the tile and the surface on which it is mounted. The tile should be of simple fabrication, require minimum material, and be as easily installed as conventional tiles. Employed as a roofing tile, such a surface covering tile would not require additional or customized roof construction, would allow the entire surface area of the roof to be used as a solar collection surface, would maintain the geometric appearance of conventional clay or cement roofing tiles, and could be used on virtually any shape or type of sloped roof design. Further, the energy absorbing underlying surface can be a source of color, with the integrity of the color being protected from weathering effects.

SUMMARY OF THE INVENTION

It is an object of the present invention to provide a surfacing tile which is simple to fabricate and install and performs the desirable functions of preventing precipitation from contacting the surface below, providing a glazing material for transmitting solar energy and resisting loss of solar energy by radiation, conduction, or convection from the heated surface beneath the tile, creating a duct directly with the supporting surface for the collection and transmission of heat generated by the solar energy, allowing the entire surface covered by the tiles to be employed as a solar energy absorption surface, and providing additional insulation for the surface on which it is mounted, for example, a roof.

The tile is simply formed and in its simplest embodiment comprises only a concave shaped member. The tile has no bottom surface or plate spanning the edges that define the concave member so that an open cavity is formed by a tile directly on the underlying mounting surface. The tile may be formed from glass, ceramic materials, plastics or combinations thereof, including laminates, coating one material with another, or impregnating one material with another. The tile could be manufactured by molding, extruding, or other shaping techniques known in the art. The tile is designed to be installed, on a sloped roof or other sloped surface, on vertical walls, the sides of buildings, on specifically designed sites, or other surfaces that face the sun, in an overlapping arrangement with other similar or identical tiles. Tiles can be arranged individually, in overlapping longitudinal columns, in laterally overlapping rows, or in both longitudinally and laterally overlapping columns and rows. The tiles are arranged such that laterally adjacent tiles are alternately installed with the concave side up and down.

Longitudinally adjacent tiles are installed with the concave side facing in the same direction, either up or down. The tile located longitudinally above an adjacent tile, overlaps the upper part of the lower tile and part of the diagonally adjacent lower tiles. Each row of longitudinally overlapping, concave side down tiles, in combination with rows of underlying laterally adjacent concave side up tiles, forms a duct for conducting air or other heat exchanging fluids heated by solar energy. The tiles are installed over any material which can be heated by solar energy. When applied as a roofing material, the tile could be installed above plywood, metal, wooden shingles, roofing felt, tar paper, or other ordinary roofing or non-roofing materials.

There are several variations of the tile design which enhance the ability to mount tiles, interconnect the tiles and to collect solar energy including the incorporation of insulating materials within the composition of the tile or air spaces within the tile material to enhance the insulating capability of the tile.

Other variations involve the use of other items in conjunction with the tile for purposes of controlling the solar energy collection capability. This could include the use of externally powered fans or pumps to force a flow of fluid through the duct formed under the tile in order to control the extraction of the heated fluid beneath the tiles.

Other variations which affect the aesthetic look or appearance of the tile, as well as the entire surface on which the tiles are mounted, include the color or lack of color of the tile, the surface texture of the tile, the basic shape of the tile, together with the color of the underlying surface. Depending on the combination of the tile's color or lack thereof or design thereon, and the color of or the design on the underlying surface, a wide variety of total surface visual effects are possible by employing tiles according to the present invention over the course of a limited part of or the entire surface.

Other variations include the shape of the tile as a means of connecting the tiles in order to tightly seal the space beneath the tiles and to distribute the support of the tiles among all the hardware used to attach all of the tiles to the roof. The use of gasket material in the fabrication of the tiles can also tightly seal the space beneath the tiles.

Other objects, features, and characteristics of the present invention will become apparent upon consideration of the following description in the appended claims with reference to the accompanying drawings, all of which form a part of the specification, and wherein referenced numerals designate corresponding parts in the various figures.

BRIEF DESCRIPTION OF THE DRAWINGS

FIG. 5 is a perspective view of the invention according to a seventh embodiment.

FIG. 5A is a cross-sectional view along line 5A—5A in FIG. 5.

FIG. 5B a cross-sectional view along line 5B—5B in FIG. 5.

FIG. 5C is a bottom view thereof.

FIG. 5D is a partial cross-sectional side view of a series of tiles in an installed arrangement.

FIG. 5E is a partial cross-sectional end view of a series of tiles in an installed arrangement.

FIG. 6 is a perspective view of the invention according to an eighth embodiment.

FIG. 6A is a side elevational view thereof.

DETAILED DESCRIPTION OF THE PRESENTLY PREFERRED EMBODIMENTS

Figure 1A:
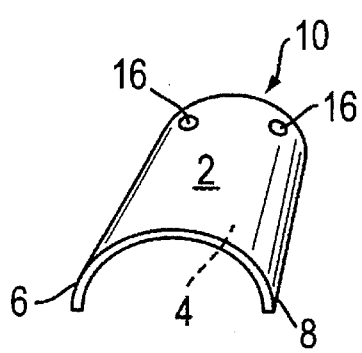
FIG. 1A is a perspective view of the invention according to a first embodiment.
Figure 1B:
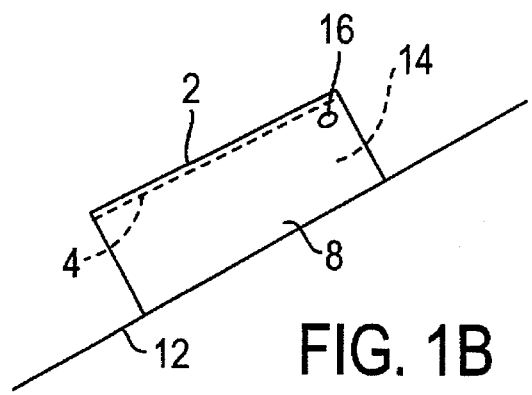
FIG. 1B is a side elevational view.
Figure 1C:
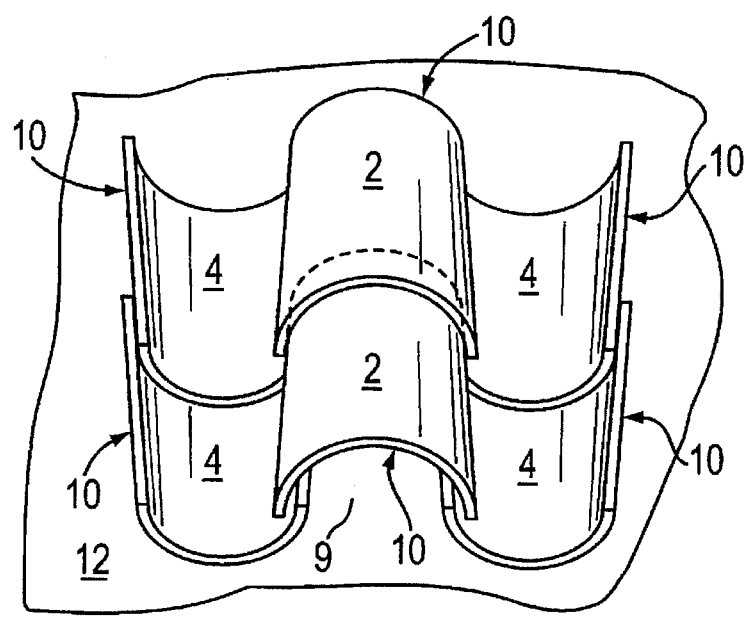
FIG. 1C is a partial perspective view of a plurality of tiles in an installed configuration.
Figure 2A:
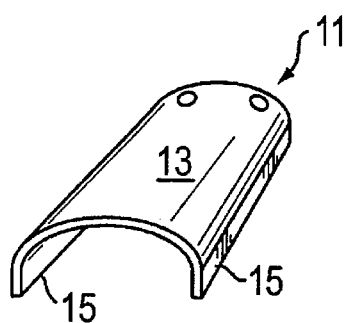
FIG. 2A is a perspective view of the invention according to a second embodiment.

A tile with solar energy collection capability, suitable for installation on any surface which can be heated by solar energy, including the roof of a building, according to a first embodiment of the present invention, is shown in FIGS. 1A, 1B and 1C. The tile 10 has a convex surface 2, a concave surface 4, and two spaced apart sides 6, 8 and is made of material which allows solar energy to pass through the tile to a heat absorbing surface 12. By concave surface is meant the hollowed or rounded surface between the two spaced apart sides whether the tile is of a curvilinear shape as in FIG. 1, a rectangular shape as in FIG. 2B, a hybrid shape as in FIG. 2A, or any other shape. The convex surface is that surface opposite the concave surface. When the tile is employed as a roofing element, the underlying surface will constitute the upper surface of the underlying roof structure or roof deck installed as part of the normal fabrication of the roof of a building.

The tiles may be formed by molding, extrusion, or other shaping techniques. Suitable materials include any of the various compositions of glass, plastic, or other materials, such as TEFLON®, TEDLAR®, KAPTON®, LEXAN®, tempered glass, or combinations thereof known in the art. They may be transparent or translucent and colored or uncolored, or otherwise formed to permit at least some portion of the solar energy striking the tiles to penetrate the material and be absorbed by the underlying surface. Transparent insulation materials such as TUFFAK® by Rohn and Haas, aerogels, foams, or other similar materials also exemplify currently contemplated suitable materials.

The tiles may of be of uniform or varying thickness. The tiles should, however, be of sufficient thickness and the material of which they are fabricated should be of sufficient strength so that the tiles may withstand a person walking upon or an occasional, moderately sized foreign object (e.g. a small tree limb) falling upon the tiles installed upon a roof or other surface. It is preferred that the tiles should be able to withstand temperatures of −60° F. to 400° F. for extended periods without cracking, melting, or deforming.

The sides 6, 8 may be parallel to one another or they may taper with respect to each other from one end of the tile to the other. A typical tapered tile would be about eighteen inches long, have a thickness varying from about 0.1 to 0.8 inches, with the exact thickness depending upon the material being used and whether that material was reinforced. The narrow end of the tile would have an outer width of about 10 inches (±about 0.5 inches) while the interior dimension of the wide end would be larger than the outer dimension of the width of the narrow end. The difference could vary from about 0.10 inches to about 0.5 inches. The tile may also have variations in wall thickness along its length. One specific example would be a tile having a wall thickness at each end of 0.15 inches, and outer width dimensions of 10.23 inches (±0.03 inches) at the wide end and 9.78 inches (±0.03 inches) at the narrow end.

When a tile 10 is installed on surface 12 as shown in FIG. 1B, the tile is supported by the sides 6, 8 on the surface 12 so as to form an air flow space 14 between the concave surface 4 and the surface 12. The heat developed in surface 12 is partially prevented from exiting through the tile 10 and is collected by a transfer fluid, such as air, contained by and flowing in the air flow space 14. The tile acts to prevent the escape of heat from the heated air and the heated surface 12 by any of the three means of heat transfer: conduction, convection, or radiation. When employed as a roofing element, the tiles are arranged in a longitudinally and laterally overlapping pattern (see FIGS. 1C and 9) in order to shed rain water or other precipitation from the top to the bottom of the roof. In addition, as shown in FIG. 1C, longitudinally overlapping tiles are arranged with their open air flow spaces aligned and connected so as to form, in combination with laterally adjacent underlying tiles, a duct 9 which can extend across the supporting surface, for instance from the base of a roof to its ridge.

The surface 12, or that surface lying under the tiles, will, when heated by absorbed solar energy, give off heat to the air contained by the ducts 9 formed by the tiles 10 and the surface 12. The ducts 9 formed under the tiles can be used to transport the heated air therein to the part of the duct where it could be used for any useful purpose, such as for example, by a heat consuming device or devices (not shown). The heated air is preferably transported to a common area where the ducts can be individually coupled to a plenum, or other flow collection system for connection to any heat consuming device, including the building's heating system. Such purposes might also include, but are not limited to, heating air or water, evaporating a refrigerant, or drying desiccant materials. The air in the ducts under the tiles could be moved either by natural convection or by forced means such as a fan (not shown).

The ducts formed by the tiles and underlying surface can be connected in several ways to additional distribution or collection ducts and heat consuming devices. These heat consuming devices could be located under, on top of, in the vicinity of, or at a distance to the supporting surface. The ducts can be provided with a variety of inlet and outlet openings to allow air to enter and exit the additional distribution ducts. The ducts could be open to the atmosphere at the top and bottom with adequate means to prevent precipitation, insects, birds, small animals, and debris from entering the ducts. The ducts could be arranged as a system, closed at the top and bottom with an interconnecting duct, connected through a heat consuming device, under the supporting surface extending from one part of the duct system to another part of the duct system to allow fluid to circulate through the duct system. The ducts could be open at either end for the purpose of bringing outside air into the duct, heating it during its flow within the duct, and discharging it to the interior of a building or to a heat consuming device. This method would provide the advantage of preheating air that would enter the building at no expense of fuel or other conventional energy source. In this way, the ability to heat air, and to maintain its quality within the building, is improved during the heating season, by introducing warmed outside high quality air into the building when the building is largely closed to the outside. A similar approach, using different air flow paths, could be used to warm air which has been excessively cooled in order to dehumidify the air in a closed building during the cooling season. Where the ducts are open to the atmosphere, screens could be installed at all the openings to keep insects, small animals, or debris from entering the ducts.

A solar collection system incorporating the tiles of the present invention can be operated at a high level of efficiency because heat can be withdrawn from within the ducts formed by the tiles to maintain a lowest desired temperature within the ducts. This will minimize energy losses due to excessive heat buildup in the tile surfaces.

During times when no additional heat is desired to be extracted from the ducts formed by the tiles, the heated air can be vented to the atmosphere. This can be accomplished by allowing convection currents to carry the air out of the ducting or by forced means such as a fan. During the warmer months, venting heated air from the ducts formed by the tiles will reduce the heat load on the surface, especially where the surface is a roof and reduce the heat transmitted into a building resulting in lower costs to cool the building.

The tiles are designed to be installed on all flat or curved surfaces, can be fitted about items protruding from a roof, and can cover all or part of an entire roof or other surface. The use of tiles over the entire surface allows the solar collection area to be maximized over known designs (square boxes or tiles with integral bottom plates designed to absorb solar energy) because previous designs have been limited to relatively small areas. Coverage of an entire roof is possible with tiles according to the present invention because they will provide a visually consistent roof surface which will be aesthetically pleasing when compared to known typical roof mounted solar collection systems which either are not a part of the roof, which project visual discontinuities from the remainder of the roof surface, or which occupy only a small amount of the total roof area. The individual tiles, having an appearance similar to the existing forms of roofing tile, will provide an aesthetically pleasing design. As noted previously, the tiles can also be produced in several colors to further improve the aesthetics of a building its walls or a roof. Alternatively, the surface beneath the tiles can be colored, thereby providing additional design options.

One additional advantage of the invention is that the ducts formed between the tiles and the underlying surface also act to increase the insulating value of the system compared to other surfacing material which does not provide an air gap between the underlying surface and an outer covering thereon. The air gap formed by the tile acts to prevent heat transfer between the surface and the outside air. This is desirable during the times when the surface is not being used to collect solar energy such as night time or during extremely cloudy periods.

In roofing situations, the tiles are installed above any of several roofing materials which can be heated by solar energy. Types of surfacing materials that can be installed directly below the tiles include, but are not limited to, roofing paper, roofing felt, rolled roofing material, wooden shingles, asphalt shingles, fiberglass shingles, metal shingles, metal roofing, paints, plastics, cements, gravel, mineral stone, plywood, lumber, textiles, or sheet metal or any energy absorbent material. Consequently, tile 10 can be used over most any form of existing roof. Similarly, the tiles can be mounted over various types of siding or surfaces specifically designed for solar heating and energy collection purposes.

As shown in FIGS. 1A & 1B, individual tiles may be provided with a hole or holes 16 to facilitate attachment of the tile 10 to the surface 12. The attachment method may incorporate nails, screws, or twisted wires (not shown) to penetrate the hole or holes 16 in the upper portion of the tile and to provide attachment to the support surface. Methods can also include those which are common for conventional clay or concrete roofing tiles.

The overlap of longitudinally adjacent tiles is sufficient to cover the attachment point of the lower tile by a portion of the upper tile and thereby prevent entry of precipitation into the attachment hole of the lower tile as water drains down the tiles. The tiles could also be designed with thin areas or knock-out pieces which could be easily penetrated or knocked out, respectively, by the attachment hardware or could remain intact if not required for the installation.

Tiles vary in design in order to accommodate the varying shapes of a roof or other surface, including the flat surface of the roof, the ridge lines of the roof, the valleys of the roof, and the variations of steepness of the roof. Different designs would be used for the purpose of covering different surfaces, including vertical walls. Different designs are also used when only one tile is used to form a duct with closed top and bottom ends or to form the end of a duct with closed ends.

The tiles of a particular design and purpose are identical which simplifies their fabrication and allows economies from mass production of such tiles and results in minimal fabrication costs. Tiles for flat surfaces will all be identical to each other for a particular installation. On the other hand, tiles for use along ridge lines or valleys, or other unique areas of a roof, wall, or other surface, will be different from the tiles designed for the flat portion of the surface.

Figure 2B:
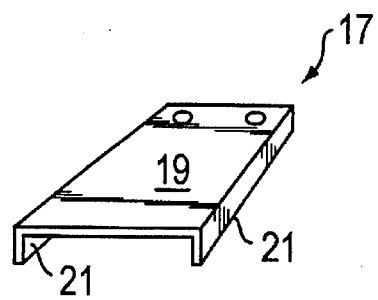
FIG. 2B is a perspective view of the invention according to the third embodiment.

The tiles may be curved, forming a shape approximating half of a truncated cone as shown in FIG. 1A and resembling what is commonly referred to as Spanish or mission tiles. Other variations of the shape of the tile are envisioned and include, but are not limited to, the second and third embodiments of the present invention shown in FIG. 2A and FIG. 2B respectively. For example, tile 11 in FIG. 2A can have a curved top portion 13 and two vertical depending sides 15. In FIG. 2B, the top portion of tile 17 can be a flat surface 19 with a pair of vertical side walls 21.

Figure 3:
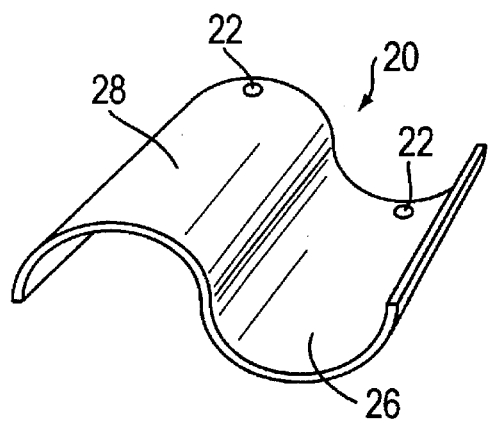
FIG. 3 is a perspective view of the invention according to a fourth embodiment.
Figure 4A:
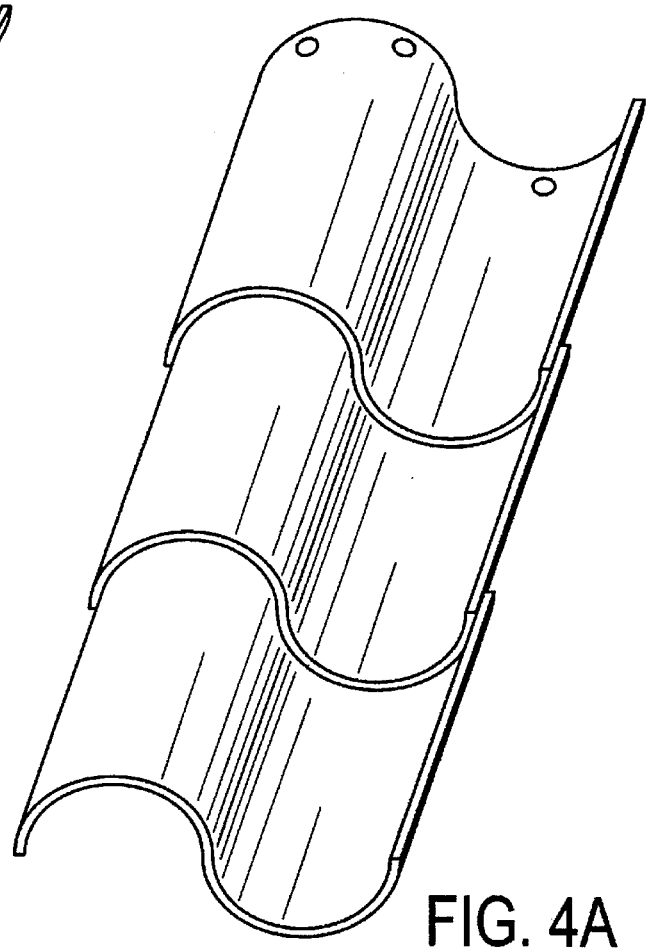
FIG. 4A is a perspective view of the invention according to a fifth embodiment.
Figure 4B:
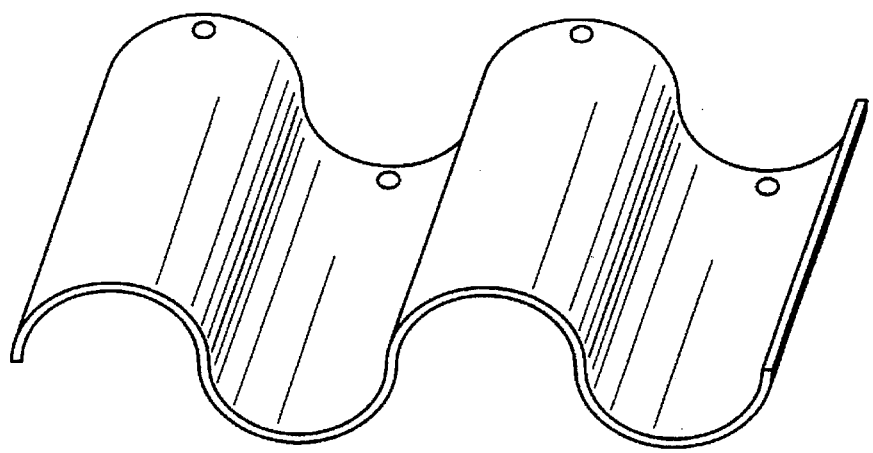
FIG. 4B is a perspective view of the invention according to a sixth embodiment.

As shown in FIG. 3, a tile 20, according to a fourth embodiment of the present invention, incorporates both a concave portion 26 and convex portion 28 formed into a single integral tile element, resembling what is commonly referred to as a Mission "S" tile. One or more holes 22 can again be used for attachment purposes. By incorporating the curvature of two individual tiles into one piece, the number of pieces requiring handling during installation is reduced. Other embodiments are envisioned in which one tile element is fabricated with multiple concave and convex surfaces repeating in the lateral direction (FIG. 4B) or the longitudinal direction (FIG. 4A), or repeating in both directions (not shown).

As shown in FIGS. 5 through 5C, another embodiment of the present invention involves the addition of tile-to-tile securing structures in the form of a convex surface end flange 30 at the end 32 of the tile and a concave surface end flange 34 at the end 36 of the tile. Either as an addition to flanges 30 and 34, or as an alternative thereto, side flanges 38 can be provided on the sides of the tile to interlock the side of one tile to the next when the tiles are installed. When used, the side flange 38 can either extend along the entire length of each side of the tile, or one or a plurality of flanges can be used at specific or spaced apart positions along each of the sides.

Figure 9A:
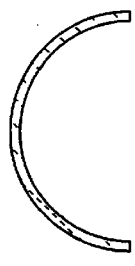
FIG. 9A is an end view in the direction indicated by line 9A—9A with the background not shown for clarity.
Figure 9B:
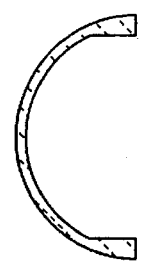
FIG. 9B is a cross-sectional view along line 9B—9B with the background not shown for clarity.
Figure 9C:
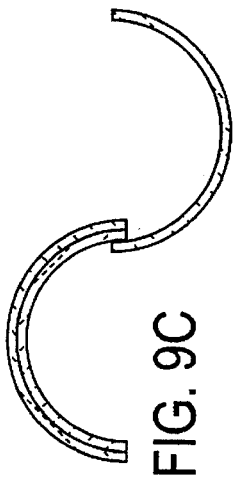
FIG. 9C a cross-sectional view along line 9C—9C with the background not shown for clarity.
Figure 9D:
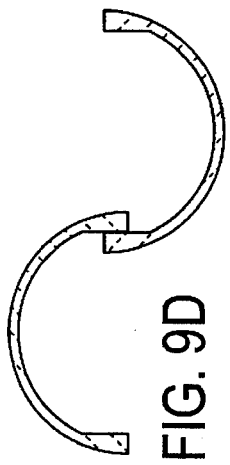
FIG. 9D cross-sectional view along line 9D—9D with the background not shown for clarity.
Figure 9E:
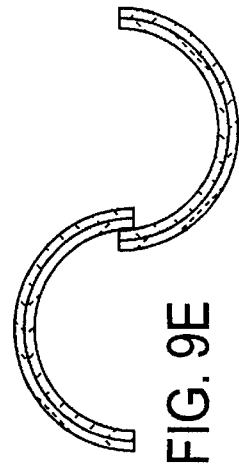
FIG. 9 is a top view of the ninth embodiment of the present invention shown in an installed arrangement.
Figure 9:
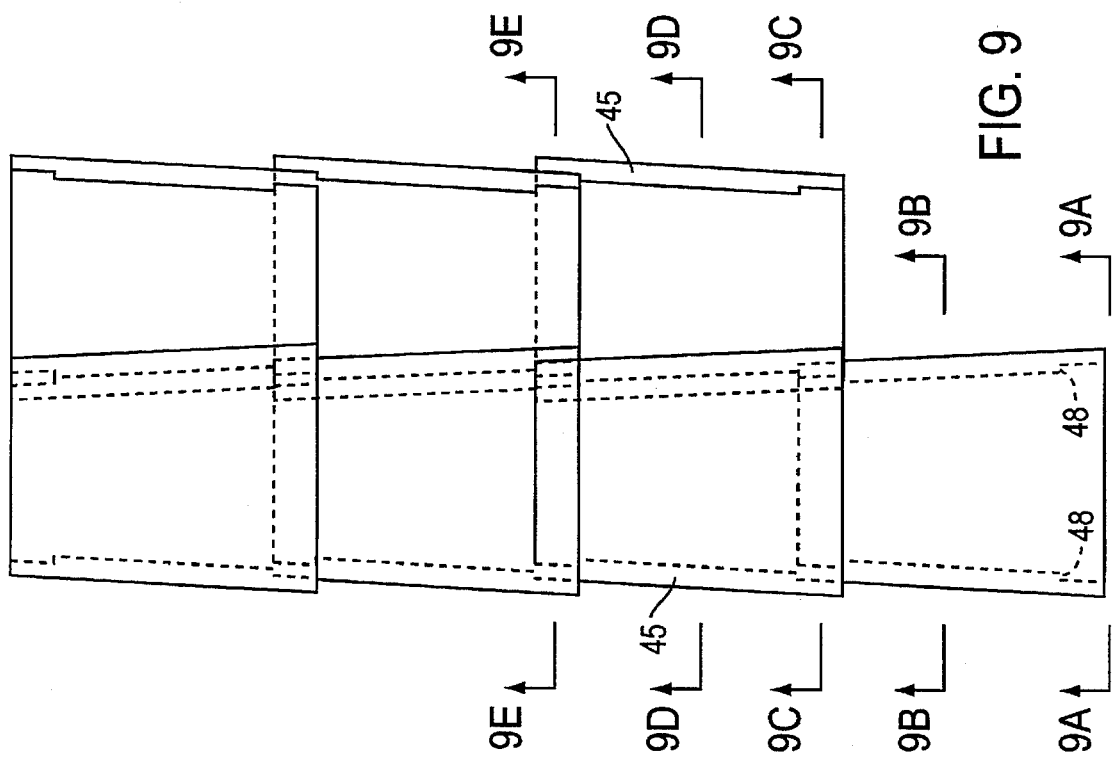

Tiles that are provided with end flanges, as shown in FIG. 5, are installed in a manner similar to that shown in FIGS. 9 and 5D. When installed, the convex surface end flange 30 of one tile is designed to interlock with the concave surface end flange 34 of an overlapping longitudinally adjacent tile. Furthermore, as shown in FIG. 5E, the side flanges 38 overlap laterally with similar side flanges 38 on adjacent tiles and thereby interlock one to the other.

The interlocking arrangements of tiles shown in FIGS. 5–5E, together with the chosen attachment medium, provide a stronger more air and water tight duct structure and surface covering. The flanges themselves form seals where tiles overlap to provide a barrier against infiltration of air and precipitation. Furthermore, the interlocking nature of the tiles prevents movement of individual tiles relative to adjoining tiles, even when an individual tile's attachment hardware has loosened or failed.

Another embodiment of the present invention is shown in FIG. 6 and relates to a tile 39 that incorporates outwardly projecting tabs 40 that protrude from the convex surface adjacent one end. Tabs 40 mate with indented slots 42 disposed on the concave surface of the sides of the tile adjacent the opposite end. Tabs 40 and slots 42 preferably have a slight curvature but could also be straight. When the tabs 40 are mated with the grooves or slots 42, they provide an alternative means of interlocking the tiles when installed.

The tabs and slots are installed in the portion of the tile which is overlapped by an adjacent tile when installed. Also, when installed the tabs on the underlying tile protrude into the slots in the overlying tile so that the slots and tabs are mutually shaped or curved. Further, the tabs and grooves terminate at an angle which is less than 90 degrees when measured from the lower end of the surface.

The tabs 40 and slots 42 together provide an interlocking design to prevent separation of the tiles in both the longitudinal and vertical directions. The tab and slot arrangement also provides a tight seal between longitudinally overlapping tiles, distributes the load among all fasteners, and provides interlocking to withstand thermal expansion and contraction of the tiles. When an overlying tile is moved down along the slope of the surface onto the underlying tile, the faces of the tabs and slots move into contact, which, due to the angle of the tabs and slots, causes reaction forces to resist the movement of the overlying tile. These reaction forces cause the overlying tile to be forced toward the surface and toward the top of the underlying tile. Similarly, the underlying tile is forced up against the overlying tile and is forced away from the surface but is restrained by the fastening device. Should the fastening device on either tile fail to support the tile, the tile would move only until the faces of the tabs and slots came into contact to prevent any further motion.

Figure 7:
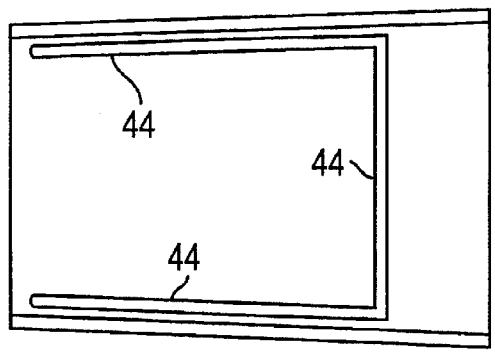
FIG. 7 is bottom view thereof incorporating strips of gasket material.

As shown in FIG. 7, another variation of the design would be to incorporate one or more strips of gasket or sealing material 44 at critical locations on the tile to insure a tight seal with the adjacent tiles. One possible location of this gasket material, as shown in FIG. 7, would be across the concave surface of the upper portion of the tile and then down each side toward the lower portion of the tile.

Figure 8B:
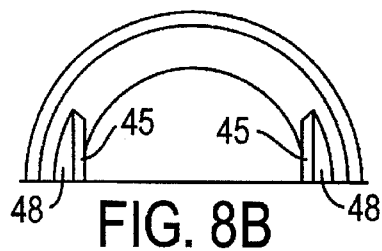
FIG. 8B is an end view in the direction indicated by line 8B—8B.
Figure 8D:
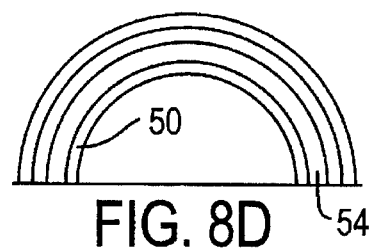
FIG. 8D is an end view in the direction indicated by line 8D—8D.
Figure 8A:
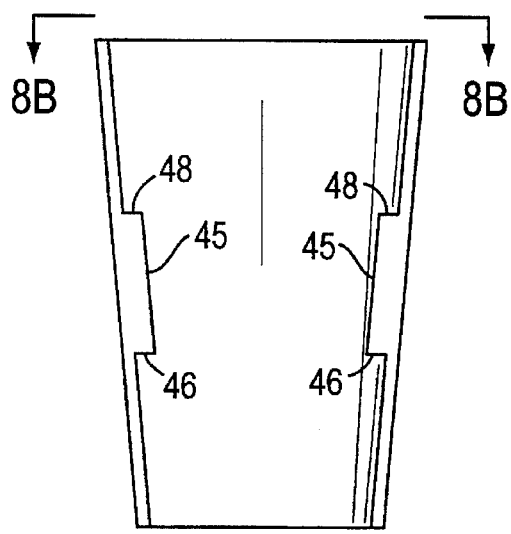
FIG. 8A is a bottom view of the invention according to a ninth embodiment.
Figure 8C:
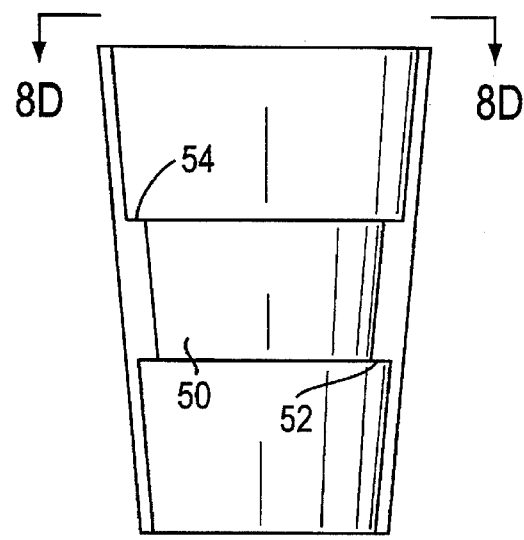
FIG. 8C is a bottom view of the invention according to a tenth embodiment.

Another variation of the present invention is shown in FIGS. 8A through 8D. As shown in FIGS. 8A and 8B, sections of increased thickness 45 are provided at a middle section of the sides of the tile to form narrow end vertical shoulders 46 and wide end vertical shoulders 48 on the inner surface of the sides of the tile. As shown in FIG. 8B, the shoulders extend vertically a short distance up the side of the tile. Alternatively, as shown in FIGS. 8C and 8D, a section of increased thickness 50, which extends from one side of the tile across the curvature to the other side, can be provided across the entire arc of the tile's concave surface, including a middle section and the sides of the tile. The section 50 forms a narrow end semi-annular shoulder 52 and a wide end semi-annular shoulder 54, the shoulders being formed in the area of the tile where adjacent tiles overlap one another when installed. The vertical or semi-annular shoulders are arranged so that when the tiles are installed, the shoulders and the ends of laterally and longitudinally adjacent tiles will abut each other as shown in FIG. 9 to effect an interlocking structure. The shoulders abut the overlapped tiles in such a manner as to form a barrier to resist infiltration of outside air or precipitation into the ducts formed below the tiles, thus forming an air and water tight duct. The shoulders may also be used to mount a gasket material thereon to further seal the duct formed by the tiles from the outside air. The interlocking structure also allows the support of the tile to be distributed to several of the adjacent tiles which are also supported in a similar manner.

One specific example of such a tile would be a tile having a length of eighteen inches. The section of increased thickness would be six inches long and would be spaced six inches from either end of the tile. The tile would have a thickness ranging from about 0.15 inches to about 0.25 inches. The section of increased thickness would have a thickness ranging from about 0.30 inches to about 0.50 inches, or roughly twice that of the remainder of the tile.

In typical tile roof construction, the support of an individual tile is provided solely by the attachment hardware of the individual tile. The use of tiles with locking flanges (FIG. 5) or shoulders (FIGS. 8A and 8C) prevents movement of an individual tile in several directions, even if the attachment hardware should become loose or fail. The various interlocking mechanisms are also provided with sufficient flexibility to accommodate expansion and contraction of the tiles, and the underlying surface, due to thermal or other causes, without loosing the seal therebetween or stressing the surface attachment points. Expansion and contraction is provided for by installing the interlocking tiles with sufficient play between the tiles, and any gaps between tiles can be filled with a resilient gasket material that can accommodate the expansion and contraction.

Figure 10A:
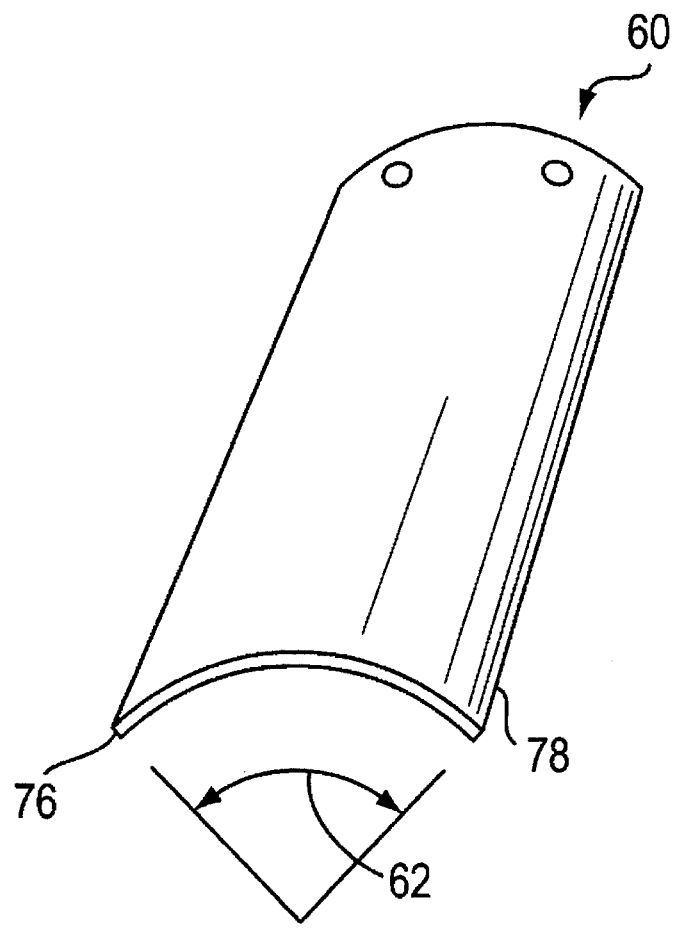
FIG. 10A is a perspective view of the invention according to an eleventh embodiment.
Figure 10B:
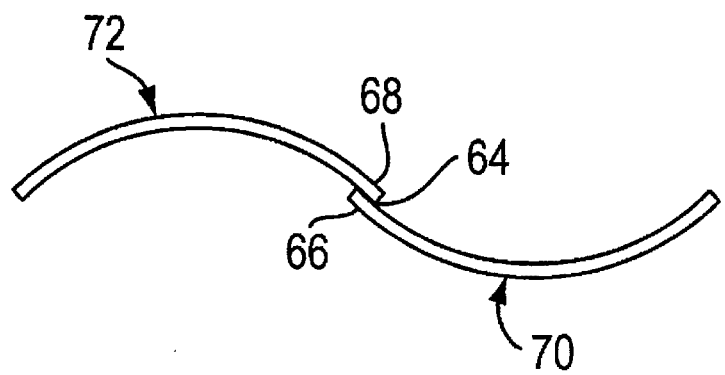
FIG. 10B is a end view of two laterally overlapping tiles.

As shown in FIG. 10A, a further embodiment of the present invention would incorporate a tile 60 in which the angle 62 subtended by the arc of the tile is on the order of 90 degrees. When installed, the sides 76, 78 of the tile 60 will lie at an angle of about 20° to 80°, and preferably about 40° to 50°, with respect to a line extending vertically from the support surface. Tiles of this sort could be fabricated to incorporate any of the aforementioned gasket material or interlocking features to improve the air and water tightness of the ducts formed thereby and to improve the strength of the surface covering formed thereby. Furthermore, laterally overlapping tiles of this sort can more easily withstand thermal expansion and contraction. As can be seen in FIG. 10B, at the section of overlap 64 between the underlying tile 70 and the overlapping tile 72, the side portion 66 of the underlying tile 70 is essentially parallel to the side portion 68 of the overlapping tile 72. Both sides are essentially parallel to the direction of lateral expansion and contraction of the tile. Upon lateral thermal expansion and contraction, the respective sides of the laterally overlapping tiles will slide over one another in parallel fashion, and therefore, without inducing any substantial stresses within the tile. The tiles must be installed with a sufficient amount of lateral overlap to insure that upon lateral thermal contraction of the tiles, no inter-tile gaps are exposed.

An alternative design of the tiles would be to incorporate additional insulating features in the design of the individual tiles to resist thermal losses by the surface material, including, but not limited to, forming the tiles with an airspace internal to the tile or forming the tile with multiple airspaces arranged between the convex and concave surfaces of the tile. Tiles of this type could be fabricated by either a 2 piece hollow construction or by forming the tile with a material having a plurality of hollow beads or gas pockets dispersed throughout. Furthermore, insulating tiles could be fabricated by forming the tile with materials of low emissivity to thermal radiation, forming the tiles with materials which selectively reflect certain bandwidths of thermal, specular, or electromagnetic radiation, or any combination of the above effects to increase the insulating value of the tiles.

Tiles according to the present invention have been described as an element suitable for roofing. However, such tiles could also be employed as a covering for any surface with a heat absorbing material exposed to sunlight. Such surfaces could include, but are not limited to, walls of buildings or other structures, surfaces constructed specifically to absorb solar energy while not forming any specific boundary of a building, the sides of grain silos or other agricultural facilities, or the covered or uncovered surface of the ground.

When the tiles are formed of fire retardant materials, the tiles would provide a fire retardant surface covering.

While the invention has been described in connection with what is presently considered to be the most practical and preferred embodiments, it is to be understood that the invention is not to be limited to the disclosed embodiments, but, on the contrary, it is intended to cover various modifications and equivalent arrangements included within the spirit and scope of the appended claims.

Thus, it is to be understood that variations in the particular parameters used in defining the tile with solar energy collection capability can be made without departing from the novel aspects of this invention as defined in the claims.

What is claimed is:

1. A surfacing tile for use as part of a solar energy collection system comprising:

a tile member shaped to provide at least a substantially smooth convex surface, a substantially smooth concave surface, two opposing open ends and two opposed and spaced apart sides by which said tile member is adapted to be supported upon a support surface so that an open air flow space is created directly between one of said convex and concave surfaces and said support surface, a substantial portion of said tile member being constructed of a material that transmits solar radiation, thus permitting the transmitted solar radiation to strike and heat air within said flow space and said support surface upon which said tile member is supported which collectively heats air in the flow space, and means for fixing said tile member to said support surface, said tile and said support surface cooperating to form at least a portion of a conduit for conveying the heated air through said flow space.

2. A tile as in claim 1 wherein said tile member has a uniform thickness.

3. A tile as in claim 1 wherein the sides are parallel.

4. A tile as in claim 1 wherein said tile member tapers from one end toward the other of said ends.

5. A tile as in claim 1 wherein the tile member is constructed from a transparent material.

6. A tile as in claim 5 wherein the transparent material is glass.

7. A tile as in claim 5 wherein the transparent material is plastic.

8. A tile as in claim 5 wherein the transparent material is comprised of a combination of glass and plastic.

9. A tile as in claim 1 wherein said sides lie at an angle ranging from about 0° to about 80° with respect to a line extending vertically from said support surface.

10. A tile as in claim 1 wherein the tile member has a curvilinear shape.

11. A tile as in claim 1 wherein the tile member is shaped to exhibit adjacent concave and convex surfaces.

12. A tile as in claim 11 wherein said tile member is integrally formed with adjacent convex and concave surfaces.

13. A tile as in claim 1 wherein said tile member is integrally formed with adjacent convex surfaces.

14. A tile as in claim 11 wherein said tile member is integrally formed with adjacent concave surfaces.

15. A tile as in claim 1 wherein said tile member includes at least one interior shoulder abutment positioned adjacent each open end and spaced inwardly therefrom to limit the extent to which an interfitting tile member can slide within said tile member and to provide a contact surface for an overlapped adjacent tile.

16. A tile as in claim 15 further including a pair of interior shoulder abutments adjacent each open end.

17. A tile as in claim 1 further including gasket means positioned on selected portions of said concave surface of said tile member for providing sealing against interfitting tile members.

18. A tile as in claim 15 wherein said interior shoulder abutment extends across the concave surface from one side to the other of said sides.

19. A tile as in claim 1 further including interconnection means for securing together adjacent tile members.

20. A tile as in claim 19 wherein said interconnection means includes seal members to provide an air tight seal between adjacent tile members.

21. A tile as in claim 19 wherein said interconnection means comprises enlarging at least one portion of each of said sides so that as tile members are joined together they interlock at said at least one enlarged portion.

22. A tile as in claim 19 wherein said interconnection means comprises enlarging a plurality of spaced apart portions along each of said sides so that as adjacent tile members are joined together said adjacent tile members interlock at said enlarged portions.

23. A tile as in claim 22 wherein the enlarged portions provide continuous contact along a length of the interlocked adjacent tile members.

24. A tile as in claim 1 wherein said tile member is comprised of a repeating number of substantially identical members integrally formed together.

25. A tile as in claim 1 wherein said tile member is molded.

26. A tile as in claim 1 wherein said tile member is pressed in a desired shape during forming.

27. A tile as in claim 1 wherein said tile member is comprised of glass.

28. A tile as in claim 27 wherein said glass is tempered.

29. A tile as in claim 1 wherein said tile member is comprised of a translucent ceramic.

30. A tile as in claim 19 wherein said interconnection means comprises at least one protrusion formed on said convex surface of said tile member, adjacent one end, and at least one groove formed on said concave surface, adjacent the opposite end, so that the projection of one tile member will interfit with the groove on a next longitudinally adjacent tile member.

31. A tile as in claim 30 wherein each tile member includes a pair of projections and a pair of grooves, each of said projections and grooves lying on opposite sides of said tile member.

32. A tile as in claim 30 wherein said at least one projection and said at least one groove, are curved.

33. A tile as in claim 1 further including at least one integrally formed insulation area within said tile member so that air adjacent one surface of said tile is insulated from air adjacent an opposing surface of said tile.

34. A tile as in claim 33 wherein said at least one insulation area comprises an air space formed between said convex and concave surfaces.

35. A tile as in claim 33 wherein said at least one insulation area comprises a plurality of spaced apart air pockets provided within said tile member.

36. A tile as in claim 33 wherein said tile member includes a plurality of spaced apart, internally formed cavities that collectively form said at least one insulation area.

37. A solar energy collection system comprising:

a solar energy absorbing surface; and a plurality of interfitting tiles supported by said energy absorbing surface and formed from a material that transmits solar radiation, thus permitting the transmitted solar radiation to strike said solar energy absorbing surface so that a plurality of ducts, extending across said solar energy absorbing surface, are formed between an interior surface of said tiles and said energy absorbing surface;

said system further including means defining an inlet into said ducts and an outlet therefrom so that a fluid can be introduced into said ducts at said inlet and flow through said ducts to the outlet and the solar energy absorbed by said solar energy absorbing surface can heat the fluid during such passage.

38. A system as in claim 37 wherein the inlet into said ducts is located adjacent one end and said outlet is located at a spaced location from said inlet.

* * * * *